United States Patent

Tsai

[19]

[11] Patent Number: 5,827,573
[45] Date of Patent: *Oct. 27, 1998

[54] METHOD FOR COATING METAL COOKWARE

[76] Inventor: Tung-Hung Tsai, No. 22, Lane 17, Chou-Kuang St., Ta-Liao Hsiang, Kaohsiung Hsien, Taiwan

[ * ] Notice: The term of this patent shall not extend beyond the expiration date of Pat. No. 5,462,769.

[21] Appl. No.: 818,840

[22] Filed: Mar. 17, 1997

[51] Int. Cl.⁶ .................................. B05D 3/00; B06B 1/00
[52] U.S. Cl. .......................... 427/327; 427/560; 427/456; 427/385.5; 427/409; 205/122; 205/208; 205/917
[58] Field of Search ...................................... 427/327, 328, 427/456, 560, 409, 307, 385.5; 205/122, 208, 917

[56] References Cited

U.S. PATENT DOCUMENTS

| 5,132,003 | 7/1992 | Mitani | 205/173 |
|---|---|---|---|
| 5,382,347 | 1/1995 | Yahalom | 205/50 |
| 5,411,771 | 5/1995 | Tsai | 427/456 |
| 5,462,769 | 10/1995 | Tsai et al. | 427/307 |
| 5,545,439 | 8/1996 | Deng et al. | 427/327 |

*Primary Examiner*—Roy V. King
*Attorney, Agent, or Firm*—Ladas & Parry

[57] ABSTRACT

A method for coating metal cookware includes the steps of (1) cleaning a cooking surface of the metal cookware; (2) roughening the cooking surface by blasting aluminum oxide particles against the cleaned cooking surface; (3) forming a scratch-resistant layer on the roughened cooking surface by electric-arc spraying an aluminum alloy onto the roughened cooking surface, the scratch-resistant layer covering about 50–90% of the area of the roughened cooking surface; (4) forming an oxide film on the scratch-resistant layer and the roughened cooking surface by anodic oxidation; and (5) applying an anti-stick film of fluorocarbon resin on the oxide film.

2 Claims, 4 Drawing Sheets

METHOD FOR COATING METAL COOKWARE

BACKGROUND OF THE INVENTION

1. Field of the Invention

This invention relates to a method for coating metal cookware, more particularly to a method for coating metal cookware which has anti-stick and scratch-resistant layers with enhanced corrosion-resistance.

2. Description of the Related Art

U.S. Pat. No. 5,545,439 by the applicant discloses a method for coating metal cookware so as to provide a metallic scratch-resistant and an anti-stick cooking surface thereto. The method provides a cooking surface which has a high hardness and good anti-stick characteristic and a very long service life.

However, rusting is still observed on the cooking surface of the metal cookware treated by the above-mentioned method when the metal cookware is boiled in 5% salt water for 20 minutes and is cooled at room temperature for 72 hours.

SUMMARY OF THE INVENTION

The object of the present invention is to provide a method for coating metal cookware in order to provide a cooking surface with improved corrosion resistance as compared to the prior art.

According to the present invention, the method for coating metal cookware comprises the steps of:

(1) cleaning a cooking surface of the metal cookware;

(2) roughening the cooking surface by blasting aluminum oxide particles against the cleaned cooking surface;

(3) forming a scratch-resistant layer on the roughened cooking surface by electric-arc spraying an aluminum alloy onto the roughened cooking surface, the scratch-resistant layer covering about 50–90% of the area of the roughened cooking surface;

(4) forming an oxide film on the scratch-resistant layer and the roughened cooking surface by anodic oxidation; and (5) applying an anti-stick film of fluorocarbon resin on the oxide film.

The step (1) may comprise immersing the metal cookware in a boiling trichloroethylene solution in which ultrasonic vibrations are excited in order to remove grease and other contaminants.

In the step (2), the aluminum alloy consisting of 0.25% by weight of silicon, 0.4% by weight of iron, 0.10% by weight of copper, 0.05–0.20% by weight of manganese, 4.5–5.5% by weight of magnesium, 0.05–0.20% by weight of chromium, 0.10% by weight of zinc, 0.06–0.20% by weight of titanium, 0.15% by weight of impurities and the remainder being aluminum.

BRIEF DESCRIPTION OF THE DRAWINGS

Other features and advantages of this invention will become apparent in the following detailed description of the preferred embodiment of this invention with reference to the accompanying drawings, in which.

DETAILED DESCRIPTION OF THE PREFERRED EMBODIMENT

Figure 1:
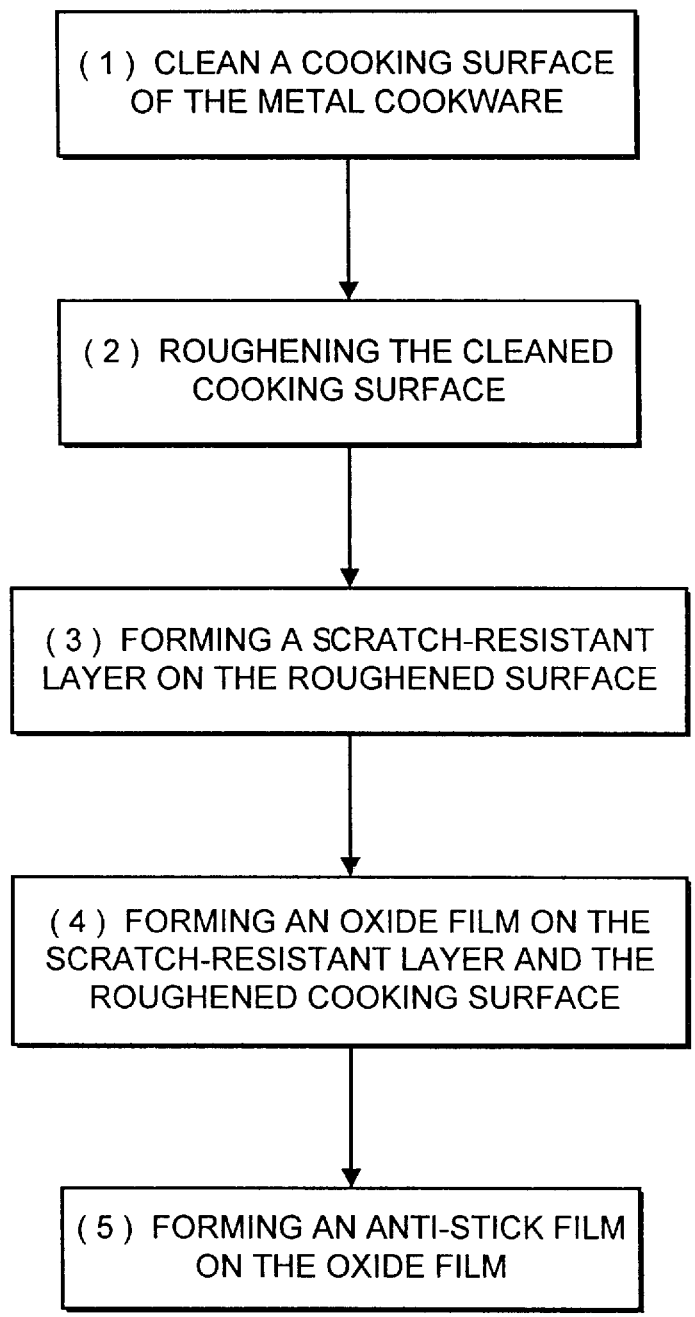
FIG. 1 is a flow diagram of a coating method of the present invention.

Referring to FIG. 1, a metal cookware, which is a product of aluminum or aluminum alloy formed by punching, is subjected to the coating method of the present invention. The method comprises the steps of (1) cleaning the cooking surface of the metal cookware; (2) roughening the cooking surface by blasting aluminum oxide particles against the cleaned cooking surface; (3) forming a scratch-resistant layer on the roughened cooking surface by electric-arc spraying an aluminum alloy onto the cooking surface; (4) forming an oxide film on the first scratch-resistant layer by anodic oxidation; and (5) applying an anti-stick film of fluorocarbon resin on the oxide film.

Figure 2:
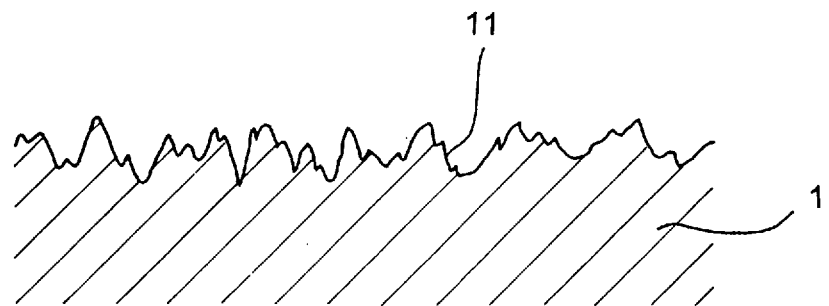
FIG. 2 is a sectional schematic view illustrating a roughened cooking surface of a metal cookware according to the present invention.

Referring to FIG. 2, a metal cookware 1, which is a product of aluminum or aluminum alloy formed by punching, is immersed in a boiling trichloroethylene solution in which ultrasonic vibrations are excited in order to remove grease and other contaminants. Fine aluminum oxide particles of 60–80 mesh are propelled by a blast of compressed air which has a pressure of about 5–8 kg/cm$^2$ and are blasted against the cleaned cooking surface in order to roughen the same with a plurality of valleys 11. The roughened surface has an average roughness of 4.5–6.0 $\mu$m and the distance between peaks and valleys 11 is about 35–65 $\mu$m. Such a roughened surface can facilitate the attachment and bonding of the scratch-resistant layer and the anti-stick layer in the subsequent coating processes.

Figure 3:
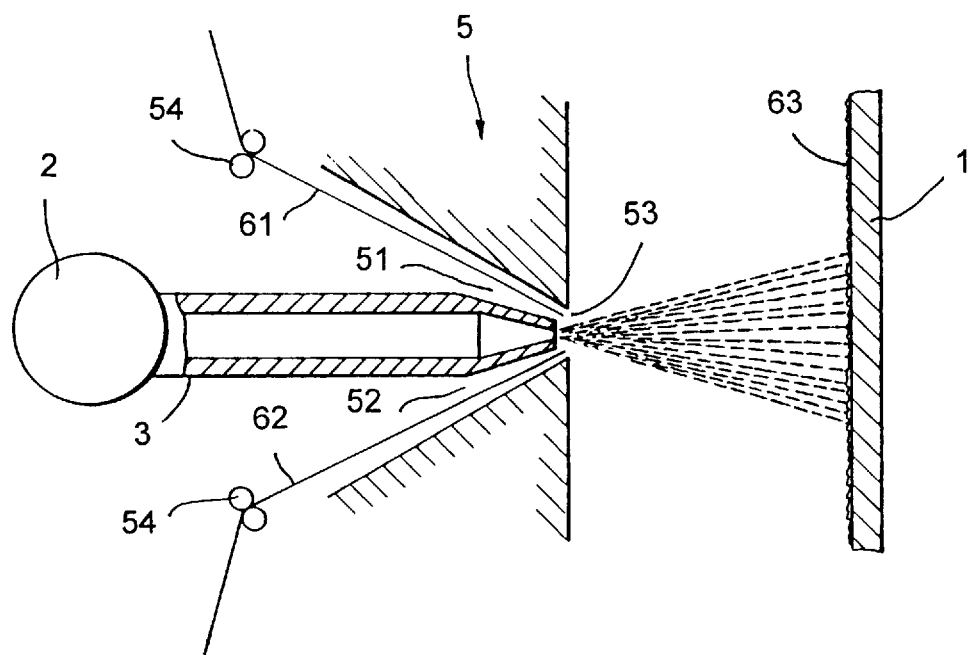
FIG. 3 is a sectional schematic view illustrating how the roughened cooking surface is coated with a scratch-resistant layer by means of an electric-arc spraying process according to the present invention.
Figure 4:
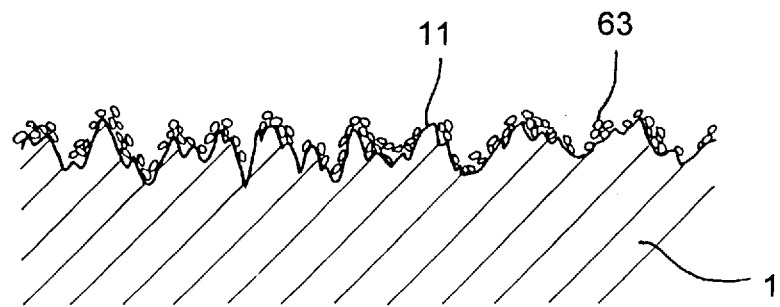
FIG. 4 is a sectional schematic view illustrating the roughened cooking surface having the scratch-resistant layer coated thereon according to the present invention.

FIG. 3 shows a scratch-resistant layer 63 applied to the roughened cooking surface by electric-arc spraying. An electric arc device 5 is mounted adjacent to the nozzle 3 and is conducted at a temperature of 1200°–6000° C., under a pressure of 5–8 kg/cm$^2$, and using a voltage of 30–40 V and a direct current of 60–200 A. Two metal wires 61, 62 are respectively fed, by means of two roller devices 54, into the electric arc device 5 along two passages 51, 52 toward an opening 53. Each of the metal wires 61, 62 is made of an aluminum alloy which consists of 0.25% by weight of silicon, 0.4% by weight of iron, 0.10% by weight of copper, 0.05–0.20% by weight of manganese, 4.5–5.5% by weight of magnesium, 0.05–0.20% by weight of chromium, 0.10% by weight of zinc, 0.06–0.20% by weight of titanium, 0.15% by weight of impurities and the remainder being aluminum. The aluminum alloy of the above-mentioned composition has an excellent corrosion resistance, as is known in the art. The metal wires 61, 62 are melted by means of the electric arc device 5 and are propelled by the compressed gas in a compressed gas source 2 so as to be sprayed onto the roughened and cleaned cooking surface in the form of a plurality of aluminum alloy particles, thus forming the scratch-resistant layer 63, as best illustrated in FIG. 4. The aluminum alloy particles sprayed on the roughened cooking surface has a plurality of gaps formed therebetween and covers 50–90% of the area of the cooking surface. The melted metal wires 61, 62 cool at a rate of 1,000,000 DGE/°F./sec while they are sprayed onto the roughened and cleaned cooking surface from the opening 53. The scratch-resistant layer 63 is formed on the roughened and cleaned cooking surface at a temperature between 60° C. and 150° C. so as to prevent deformation of the metal cookware 1. Thus, even if a thin metal cookware is used, deformation will not occur. The scratch-resistant layer 63 formed on the cooking surface has a thickness preferably of about 30–120 $\mu$m and exhibits increased hardness. Accordingly, the corrosion resistance of the metal cookware 1 can be enhanced.

Figure 5:
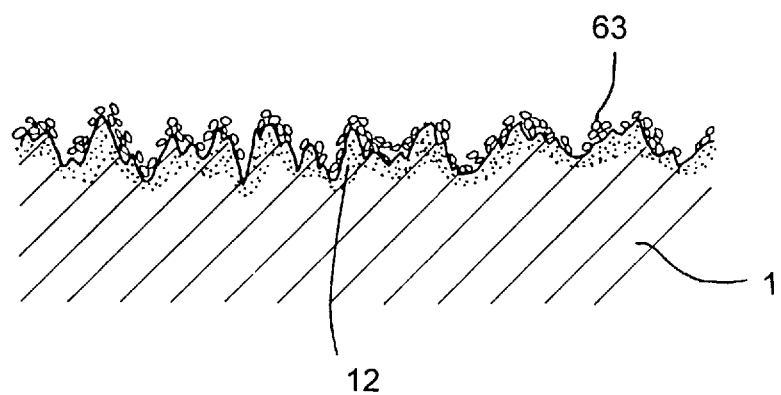
FIG. 5 is a sectional schematic view illustrating an oxide film formed on the scratch-resistant layer and the roughened cooking surface according to the present invention.

The metal cookware 1 undergoes an anodic oxidation process in order to form a hard oxide film 12 on the scratch-resistant layer 63 and the roughened cooking surface, as best illustrated in FIG. 5. During the anodic oxidation process, an electrolytic solution containing sulfuric acid, magnesium sulfate and ferrous sulfate and having a concentration of 100–350 g/L is provided. The temperature is controlled at −5° to 20° C. The current density is 2–3.5 A/dm$^2$ (about 24–37 amp/ft$^2$) and the electrolytic voltage is 10–25 V. The oxide film 12 contains aluminum oxide, magnesium oxide and iron oxide and has a thickness of about 10–50 $\mu$m.

Figure 6:
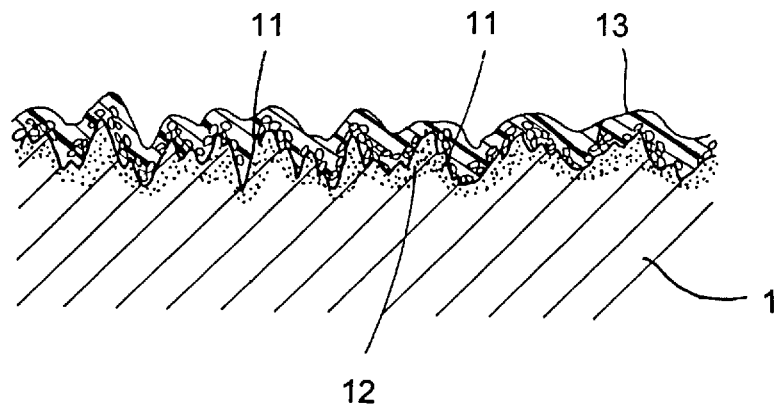
FIG. 6 is a sectional schematic view illustrating the oxide film having a primer coating formed thereon according to the present invention.
Figure 7:
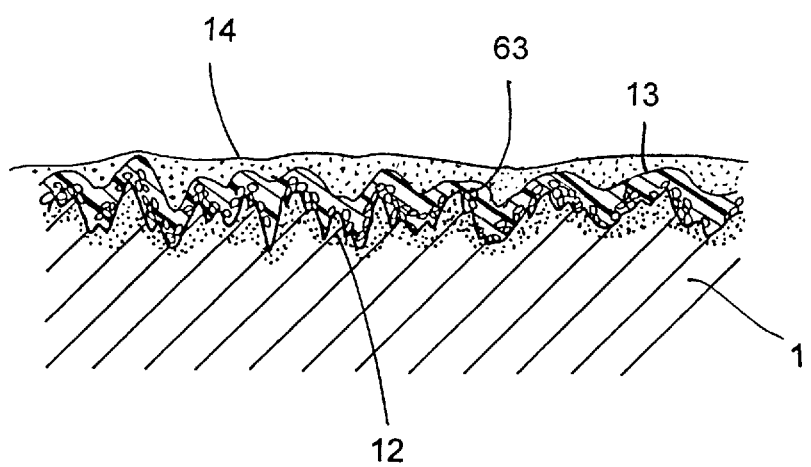
FIG. 7 is a sectional schematic view illustrating the primer coating having a top coating formed thereon according to the present invention.

Referring to FIG. 6, suspended fluorocarbon resin (PTFA/PFA) is sprayed onto the oxide film 12 by 0.2–3.5 kg/cm$^2$ of pressurized air. The metal cookware 1 is then dried in a drying oven at about 50°–120° C. for about 5 minutes. The suspended fluorocarbon resin embeds into the valleys 11 and bonds tightly with the oxide film 12 and the cooking surface of the metal cookware 1 in order to form a primer coating 13. The thickness of the primer coating 13 is about 6–15 $\mu$m and has a high hardness. The suspended fluorocarbon resin is further sprayed onto the primer coating 13 in order to form a top coating 14, as best illustrated in FIG. 7. The metal cookware 1 is dried in a drying oven at a temperature of about 150° C. for about 10 minutes, and is further heated at a temperature of about 350°–420° C. for about 5 minutes such that sintering process for the fluorocarbon resin is carried out. The thickness of the top coating 14 is about 15–25 $\mu$m. The metal cookware 1 is then removed from the drying oven and is cooled forcibly with a strong fan in atmosphere conditions.

Since the total thickness of the coatings on the cooking surface of the metal cookware 1 is greater than that of the coatings on the cooking surface of the metal cookware described in U.S. Pat. No. 5,545,439 because the scratch-resistant layer 63 has a thickness of 30–120 $\mu$m, the hardness and the corrosion resistance of the cooking surface of the metal cookware 1 are effectively increased as compared to the aforementioned prior art. It is found that the hardness of the coatings of the metal cookware 1 is greater than 9H. In addition, when the metal cookware 1 of the present invention is boiled in 5% salt water for 20 minutes and is cooled for 72 hours, no rust can be found on the cooking surface of the metal cookware 1. Therefore, the corrosion resistance of the coating which is formed by employing the method of the present invention is superior to that of the coating which is formed by employing the conventional method.

While the present invention has been described in connection with what is considered the most practical and preferred embodiment, it is understood that this invention is not limited to the disclosed embodiment but is intended to cover various arrangements included within the spirit and scope of the broadest interpretations and equivalent arrangements.

I claim:

1. A method for coating metal cookware having a cooking surface, comprising the steps of:

(1) cleaning said cooking surface of said metal cookware by immersing said metal cookware in a boiling trichloroethylene solution in which ultrasonic vibrations are excited in order to remove grease and other contaminants.

(2) roughening said cooking surface by blasting aluminum oxide particles against said cleaned cooking surface;

(3) forming a scratch-resistant layer on said roughened cooking surface by electric-arc spraying an aluminum alloy onto said roughened cooking surface, said scratch-resistant layer covering about 50–90% of the area of said roughened cooking surface, said scratch-resistant layer has a thickness of about 30–120 $\mu$m, said aluminum alloy consisting of 0.25% by weight of silicon, 0.4% by weight of iron, 0.10% by weight of copper, 0.05–0.20% by weight of manganese, 4.5–5.5% by weight of magnesium, 0.05–0.20% by weight of chromium, 0.10% by weight of zinc, 0.06–0.20% by weight of titanium, 0.15% by weight of impurities and the remainder being aluminum;

(4) forming an oxide film on said scratch-resistant layer and said roughened cooking surface by anodic oxidation, said oxide film has a thickness of about 10–50 $\mu$m; and (5) applying an anti-stick film of fluorocarbon resin on said oxide film by applying a primer coating of fluorocarbon resin and heating said primer coating; applying a top coating of fluorocarbon resin and heating said top coating; and cooling forcibly said top coating, said primer coating has a thickness of 6–15 $\mu$m, said top coating has a thickness of 15–25 $\mu$m.

2. The method of coating a metal cookware as claimed in claim 1, wherein an electrolytic solution used in step (4) is a mixture of sulfuric acid, magnesium sulfate and ferrous sulfate.

* * * * *